(12) United States Patent
Camick

(10) Patent No.: US 7,447,414 B1
(45) Date of Patent: Nov. 4, 2008

(54) CABLE PROTECTOR APPARATUS

(76) Inventor: Wayne Camick, 48 Audubon Lake Dr., Mandeville, LA (US) 70471

( * ) Notice: Subject to any disclaimer, the term of this patent is extended or adjusted under 35 U.S.C. 154(b) by 0 days.

(21) Appl. No.: 11/765,118

(22) Filed: Jun. 19, 2007

Related U.S. Application Data

(60) Provisional application No. 60/805,174, filed on Jun. 19, 2006.

(51) Int. Cl.
G02B 6/00 (2006.01)

(52) U.S. Cl. .......... 385/136; 385/99; 385/107; 385/137; 174/45 R; 174/109; 174/102 SP

(58) Field of Classification Search ............. 385/99, 385/107, 136, 137; 174/45 R, 109, 102 SP
See application file for complete search history.

(56) References Cited

U.S. PATENT DOCUMENTS

| | | | |
|---|---|---|---|
| 2,506,064 A | 5/1950 | Christie | |
| 2,550,021 A | 4/1951 | Rappi | |
| 3,161,210 A | 12/1964 | Loof | |
| 3,519,728 A | 7/1970 | Gillernot | |
| 4,358,634 A * | 11/1982 | Dienes | 174/88 R |
| 4,409,430 A * | 10/1983 | Boscher et al. | 174/92 |
| 4,581,481 A * | 4/1986 | Moretti | 174/135 |
| 4,740,653 A * | 4/1988 | Hellbusch | 174/21 R |
| 4,819,630 A * | 4/1989 | DeHart | 606/15 |
| 4,880,676 A | 11/1989 | Puigcerver et al. | |
| 5,533,161 A * | 7/1996 | Atkeisson et al. | 385/99 |
| 5,678,609 A * | 10/1997 | Washburn | 138/107 |
| 5,792,989 A * | 8/1998 | Smith | 174/77 R |
| 5,832,164 A * | 11/1998 | Miekis | 385/136 |
| 6,256,438 B1 * | 7/2001 | Gimblet | 385/109 |
| 6,466,727 B1 * | 10/2002 | Leeb | 385/137 |
| 7,099,551 B2 * | 8/2006 | Hallinan | 385/136 |
| 2002/0141712 A1 * | 10/2002 | O'Connor et al. | 385/107 |
| 2004/0213541 A1 * | 10/2004 | Hallinan | 385/147 |

* cited by examiner

*Primary Examiner*—Frank G Font
*Assistant Examiner*—Ryan Lepisto
(74) *Attorney, Agent, or Firm*—Garvey, Smith, Nehrbass & North, L.L.C.; Seth M. Nehrbass; Charles C. Garvey, Jr.

(57) ABSTRACT

A cable protector (for protecting e.g. optical cable) apparatus provides an elongated flexible body having a central longitudinal bore for holding the cable to be protected. The elongated body provides an outer surface, an inner surface, and a mass of flexible absorbent material in between the inner and outer surfaces. The mass of flexible material carries a plurality of longitudinally extending channels, each channel positioned generally in between the inner and outer surfaces. A slot extends between the inner and outer surfaces for enabling a user to expose the central longitudinal bore by spreading the slot apart so that the cable can be placed into the central bore via the slot.

23 Claims, 3 Drawing Sheets

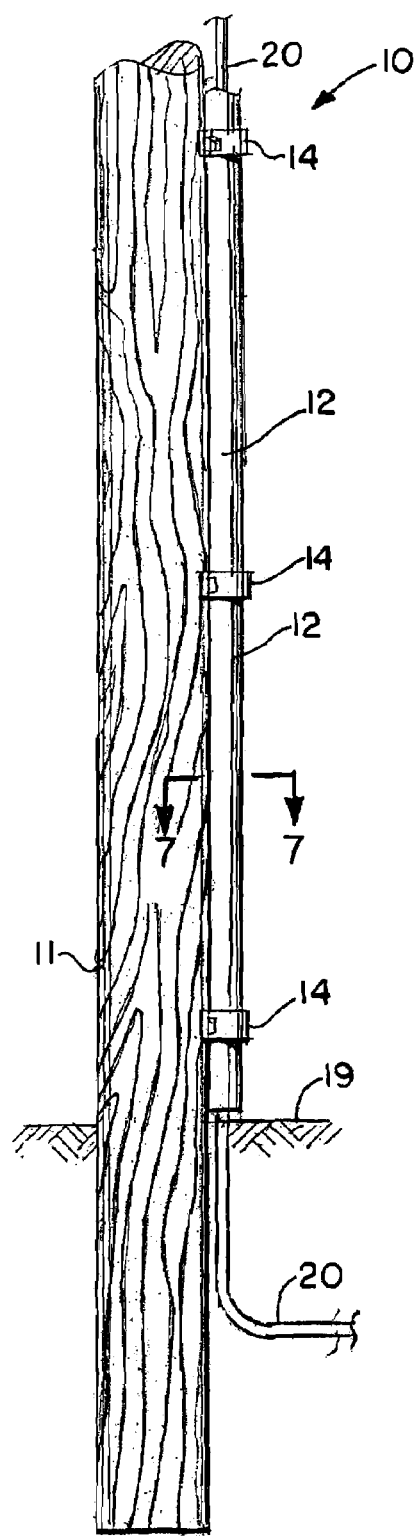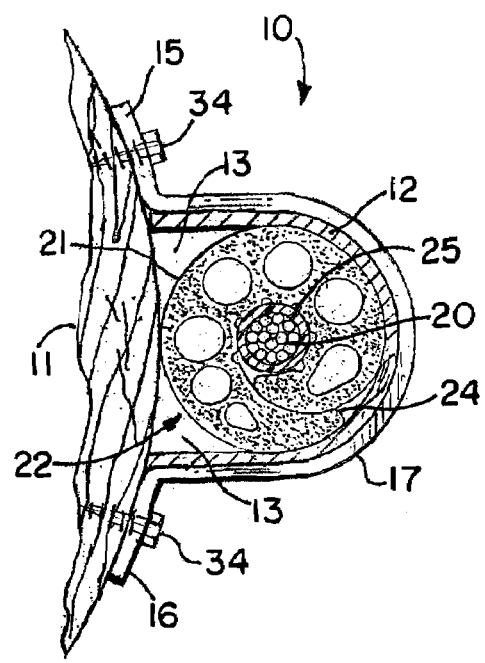
FIG. 6.
FIG. 7.

CABLE PROTECTOR APPARATUS

CROSS-REFERENCE TO RELATED APPLICATIONS

Priority of my U.S. Provisional Patent Application No. 60/805,174, filed 19 Jun. 2006, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an improved cable protector apparatus in the form of an elongated, generally cylindrically shaped protective shield that encapsulates a cable to be protected (e.g. an optical cable). More particularly, the present invention relates to an improved cable protector apparatus that has inner and outer surfaces with a cushioned flexible body of material between the inner and outer surfaces, a plurality of longitudinally extending channels extending through the flexible material and in between the inner and outer surfaces, and wherein a slot extends between the inner and outer surfaces to form an opening that enables a cable to be inserted into the longitudinal bore via the slot.

2. General Background of the Invention

Cables are often placed in environments that subject the cable to damage. Cables buried underground often emerge next to a utility pole wherein the cable is attached to the outer surface of the utility pole. These installations are subject to damage such as when an automobile inadvertently backs into or swipes the utility pole, thus crushing the cable.

The following patents are incorporated herein by reference: U.S. Pat. Nos. 4,358,634; 5,792,989; 4,409,430; 3,161,210; 2,550,021; 4,880,676; 2,506,064; 3,519,728; 3,161,210.

BRIEF SUMMARY OF THE INVENTION

The present invention provides an improved cable protector apparatus that can be easily added to a section of cable to be protected by encapsulating it.

The apparatus is being in the form of an elongated tube-like body that has inner and outer surfaces with a cushioned, flexible material provided in between the inner and outer surfaces.

A plurality of circumferentially spaced apart longitudinally extending hollow channels are positioned within the elongated body in between the inner and outer surfaces. The hollow channels are spaced apart, each being surrounded by the cushioned flexible material.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is an elevation view of the preferred embodiment of the apparatus of the present invention showing an installation on a utility pole; and FIG. 7 is a sectional view of the preferred embodiment of the apparatus of the present invention taken along lines 7-7 of FIG. 6.

DETAILED DESCRIPTION OF THE INVENTION

Figure 5:
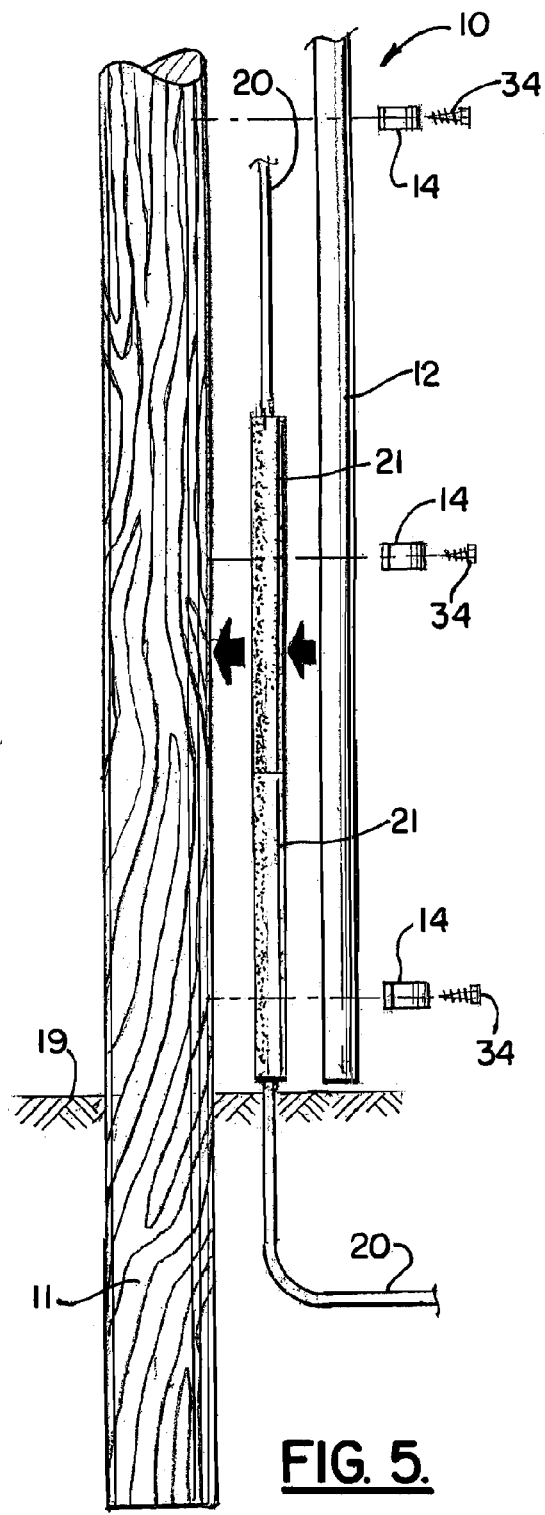
FIG. 5 is an exploded elevation view of the preferred embodiment of the apparatus of the present invention showing an installation to a utility pole.

FIGS. 1-7 show the preferred embodiment of the apparatus of the present invention, designated generally by the numeral 10. The cable protector apparatus 10 is shown attached to a utility pole 11 in FIGS. 4, 5, and 6. When installed on a utility pole 11, a shield 12 can be used for protectively containing the elongated body 21 (or bodies 21—two are shown in FIG. 5 abutted end-to-end) of cable protector apparatus 10. Shield 12 has an interior space 13 that is receptive of elongated body 21 as shown in FIG. 7. A series of clamps 14 can be used to attach shield 12 and elongated body 21 to utility pole 11. Each clamp 14 can provide spaced apart flanges 15, 16 and a U-shaped section 17 (see FIG. 7).

Clamps 14 can be attached to utility pole 11 at spaced apart intervals as shown in FIGS. 5 and 6. The clamps 14 envelop shield 12 and elongated body 21 as shown in FIG. 7. The installation shown in FIGS. 5-7 can be used, for example, when an optical cable 20 or other selected cable extends from the earth 19 upwardly along the outer surface of a utility pole 11. Elongated body 21 protectively contains optical cable 20 within central longitudinal bore 25.

In FIGS. 1-4, cable protector apparatus 10 provides an elongated body 21 having an outer surface 22, inner surface 23, a central longitudinal bore 25, and a slot 24 that extends from inner surface 23 to outer surface 22 as shown in FIGS. 2-4 and 7.

A plurality of longitudinal hollow channels 27 that have a generally circular cross section are positioned in between inner surface 23 and outer surface 22.

Figure 1:
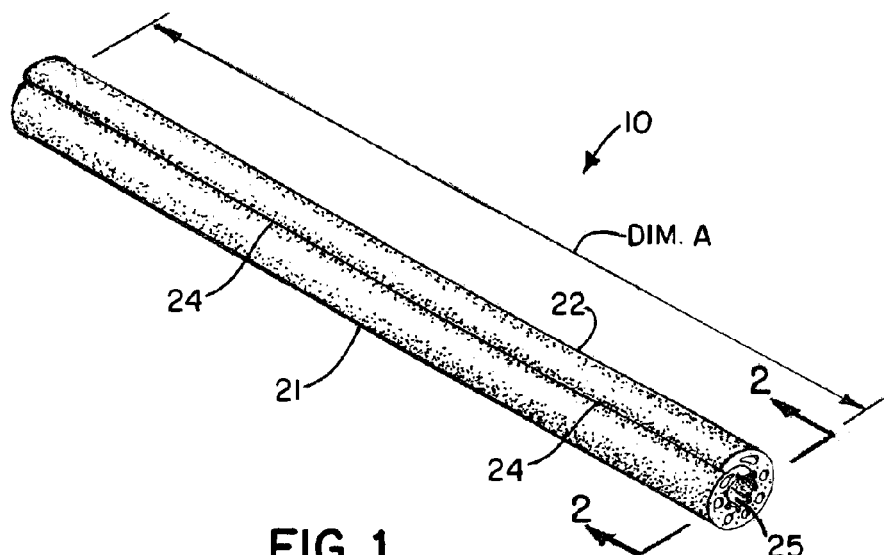
FIG. 1 is a perspective view of the preferred embodiment of the apparatus of the present invention.
Figures 2, 3:
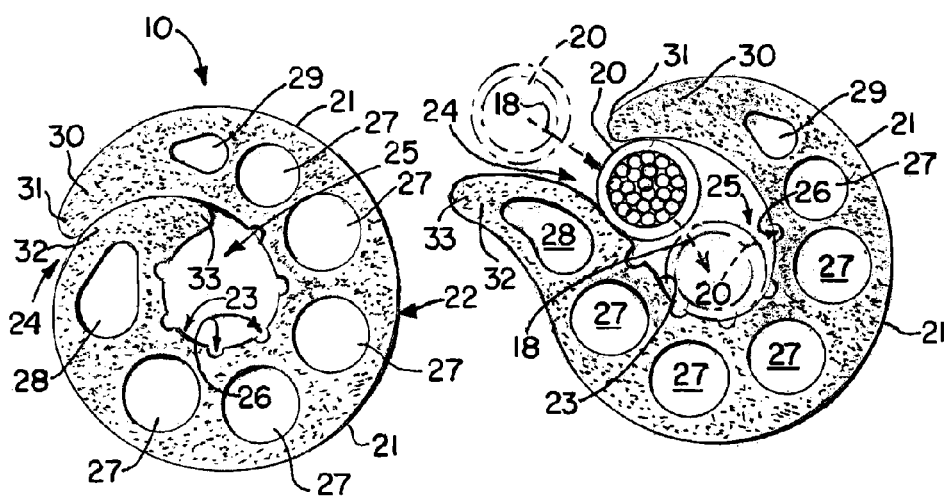
FIG. 2 is a sectional view of the preferred embodiment of the apparatus of the present invention taken along lines 2-2 of FIG. 1.
FIG. 3 is a sectional view of the preferred embodiment of the apparatus of the present invention showing insertion of a cable into the longitudinal bore of the elongated protector body.
Figure 4:
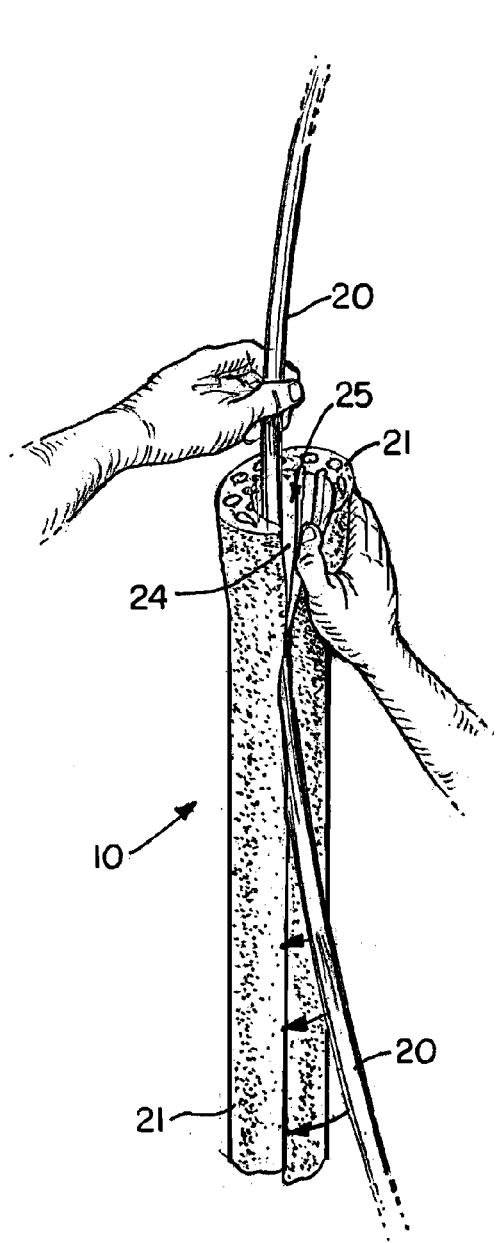
FIG. 4 is a perspective view of the preferred embodiment of the apparatus of the present invention illustrating placement of a cable such as an optical cable into the central, longitudinal bore of the cable body.

Slot 24 is defined by overlapping tapered sections 30, 32. Each tapered section 30, 32 provides a free end. Tapered section 30 has free end 31. Tapered section 32 has free end 33. Next to tapered section 30 there is provided a hollow, longitudinal channel 29 that is not circular in cross section but that is of a tapered oval cross section that is shown in FIGS. 2 and 3. Similarly, tapered section 32 provides an elongated, hollow longitudinal channel 28 that has a tapered oval cross section as shown in FIGS. 2 and 3. Tapered sections 30, 32 are separated (see FIGS. 3 and 4) to enlarge slot 24 and enable placement of cable 20 into longitudinal bore 25 (with cable 20 moving in the direction of arrows 18 in FIG. 3). A plurality of longitudinal grooves 26 are provided on inner surface 23 (see FIGS. 2 and 3). These grooves 26 allow tapered sections 30, 32 to more easily separate than if grooves 26 were not present.

The U-guard on utility poles is typically about 8 feet high (power companies do not like for the electrically conductive U-guards to get too close to powerlines). To help prevent vandals from cutting cable above the U-guard, one can extend the cable guard up above U-guard to about 16-20' above the ground (using, e.g., clamps 14). To further protect the cable, one can install fiberglass rods in one or more longitudinal openings 27 to make it harder for vandals to reach the protected cable. In such a case, one would extend the fiberglass rods from at least a slight overlap with the U-guard to high enough that vandals cannot easily reach above the tops of the fiberglass rods in cable protector body 21 (or bodies 21—multiple bodies abutted end-to-end are used in typical installations). In some cases, the fiberglass rods extend to the top of the uppermost protector body 21. A frictional fit, silicone, or glue can hold fiberglass rods in place (near powerlines fiberglass is preferred due to its poor electrical conductivity, but steel rods could used instead of fiberglass in areas not near powerlines).

The fiberglass rods can overlap the U-guard to some extent, but it is preferred that the rods not extend low enough that they will interfere with the ability of the cable to be received in a longitudinal opening 27, 28, or 29 when a cable protector body 21 is impacted by a vehicle. The U-guard provides some protection against vandals cutting through the cable, so the fiberglass rods are not necessary behind the U-guard.

The cable is sometimes small enough to be completely received in one of the longitudinal openings 27, 28, or 29, though often it is larger, so that it is only partially received in a longitudinal opening 27, 28, or 29 if the cable protector body 21 is impacted by a vehicle.

It should be understood that while the cable protector apparatus 10 shown in FIGS. 1-7 can be attached to a utility pole 11 using clamps 14, shield 12 and fasteners 34, it is possible to use the cable protector apparatus 10 of the present invention in other installations, such as, for example, wherein cable 20 is being supported by the fork of a tree. In such a case, the cable protector apparatus 10 might employ elongated body 21, but not shield 12 and clamps 14.

Also, the cable protector apparatus 10 can be used to protect cable in buildings. In such a case, when cable turns a corner, the cable protector apparatus 10 can be used to protect a cable and steel rods, for example, can be placed in longitudinal openings 27 to cause body 21 to bend the proper amount (if the steel rods were not used, the cable might not remain bent at the proper angle, but instead unbend). Thus, the steel rods help body 21 hold the shape of the curve.

Typically three cables can be received in the cental opening 25. The minimum bending radius of fiber cable during construction is usually 10× the diameter, and the minimum static bending radius of fiber cable is usually 20× the diameter. The cable protector apparatus 10 helps to prevent the cable from bending that much.

Cable protector body 21 can be of a polymeric, injection molded plastic, rubber, rubber-like material, or any other flexible material that can be used to absorb shock. The apparatus 10 of the present invention provides the longitudinal channels 27, 28, 29 and grooves 26 for enabling the elongated body 21 to collapse if inadvertently compressed by an automobile or other powerful device.

The material that is used to construct the elongated body 21 is any suitable material that absorbs shock when subjected to a compressive load such as an automobile striking the apparatus 10 and power pole 11 shown in FIGS. 5 and 6. The preferred material for constructing elongated body 21 is a synthetic rubber known as EPDM 70.

Attached to my U.S. Provisional Patent Application No. 60/805,174 and incorporated herein by reference is sales literature for the cable protector apparatus of the present invention. In this literature, FTTH means "fiber to the home" or "fiber to the premises."

There can be, for example, about 0-12 (preferably 6-8) longitudinal openings or channels 27, 28, or 29. The diameter of longitudinal openings or channels 27 can be about ⅛"-1" (preferably ¼"-½"), for example. The length of body 21 (dimension DIM A in FIG. 1) can be about 1-1000 feet (preferably 2'-10', and most preferably about 4'-5'), for example. The outer diameter of body 21 can be about ¾"-6" (preferably 1.75-2.75"), for example. The diameter of bore 25 can be about ¼"-3", for example.

The following is a list of parts and materials suitable for use in the present invention:

| PARTS LIST | |
| --- | --- |
| Parts Number | Description |
| 10 | cable protector apparatus |
| 11 | pole |
| 12 | shield |
| 13 | interior space |
| 14 | clamp |
| 15 | flange |
| 16 | flange |
| 17 | U-shaped section |
| 18 | arrow |
| 19 | earth |
| 20 | optical cable |
| 21 | elongated body |
| 22 | outer surface |
| 23 | inner surface |
| 24 | slot |
| 25 | central longitudinal bore |
| 26 | longitudinal groove |
| 27 | longitudinal channel |
| 28 | longitudinal channel |
| 29 | longitudinal channel |
| 30 | tapered section |
| 31 | free end |
| 32 | tapered section |
| 33 | free end |
| 34 | fastener |
| DIM A | 1-1000 feet |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An optical cable protector apparatus comprising;
   a) an elongated flexible member having a central longitudinal bore for holding the cable to be protected, the member having an outer surface, in inner surface and a mass of flexible material in between the inner and outer surfaces;
   b) a plurality of longitudinally extending channels in the mass of flexible material, each channel positioned generally in between the inner and outer surfaces; and
   c) a slot that extends between the inner and outer surfaces for enabling a user to expose the central longitudinal bore by spreading the slot apart.

2. The cable protector apparatus of claim 1 wherein the elongated flexible member is of a rubber like material.

3. The cable protector apparatus of claim 1 wherein the elongated flexible member is of a rubber material.

4. The cable protector apparatus of claim 1 wherein the elongated flexible member is of a polymeric material.

5. The cable protector apparatus of claim 1 wherein the shell is of a metallic material.

6. The cable protector apparatus of claim 1 wherein the slot extend generally radially.

7. The cable protector apparatus of claim 1 wherein the slot forms an acute angle with a radial line extending from the center of the central longitudinal axis.

8. The cable protector apparatus of claim 1 wherein there are about 6-8 channels.

9. The cable protector apparatus of claim 1 further comprising a plurality of longitudinally extending grooves along the inner surface.

10. The cable protector apparatus of claim 1 wherein the outer surface is generally cylindrically shaped.

11. A pole mounted cable protector apparatus comprising;
    a) an elongated flexible member having a central longitudinal bore for holding the cable to be protected, the member having an outer surface, in inner surface and a mass of flexible material in between the inner and outer surfaces;
    b) a plurality of longitudinally extending channels in the mass of flexible material, each channel positioned generally in between the inner and outer surfaces;
    c) a slot that extends between the inner and outer surfaces for enabling a user to expose the central longitudinal bore by spreading the slot apart.

12. The pole mounted cable of claim 11 wherein the elongated flexible member is of a rubber like material.

13. The pole mounted cable of claim 11 wherein the elongated flexible member is of a rubber material.

14. The pole mounted cable of claim 11 wherein the elongated flexible member is of a polymeric material.

15. The pole mounted cable of claim 11 wherein the slot extend generally radially.

16. The pole mounted cable of claim 11 wherein the slot forms an acute angle with a radial line extending from the center of the central longitudinal axis.

17. The pole mounted cable of claim 11 wherein there are about 6-8 channels.

18. The pole mounted cable of claim 11 further comprising a plurality of longitudinally extending grooves along the inner surface.

19. The pole mounted cable of claim 18 wherein there is a longitudinally extending groove positioned generally in between each pair of channels.

20. A pole mounted cable protector apparatus comprising;
    a) an elongated flexible member having a central longitudinal bore for holding the cable to be protected, the member having an outer surface, in inner surface and a mass of flexible material in between the inner and outer surfaces;
    b) a plurality of longitudinally extending channels in the mass of flexible material, each channel positioned generally in between the inner and outer surfaces; and
    c) a slot that extends between the inner and outer surfaces for enabling a user to expose the central longitudinal bore by spreading the mass of flexible material apart, widening the slot.

21. The pole mounted cable protector apparatus of claim 1 further comprising an outer protective shell that encloses the elongated flexible member in between the shell and a pole to which the cable, shell and elongated flexible member are mounted.

22. The pole mounted cable protector apparatus of claim 11 further comprising an outer protective shell that encloses the elongated flexible member in between the shell and a pole to which the cable, shell and elongated flexible member are mounted.

23. The pole mounted cable protector apparatus of claim 20 further comprising an outer protective shell that encloses the elongated flexible member in between the shell and a pole to which the cable, shell and elongated flexible member are mounted.

* * * * *